US008724921B2

(12) United States Patent
Jin

(10) Patent No.: US 8,724,921 B2
(45) Date of Patent: May 13, 2014

(54) METHOD OF CAPTURING HIGH DYNAMIC RANGE IMAGES WITH OBJECTS IN THE SCENE

(75) Inventor: Elaine W. Jin, Fremont, CA (US)

(73) Assignee: Aptina Imaging Corporation, George Town (KY)

( * ) Notice: Subject to any disclaimer, the term of this patent is extended or adjusted under 35 U.S.C. 154(b) by 1773 days.

(21) Appl. No.: 12/115,022

(22) Filed: May 5, 2008

(65) Prior Publication Data

US 2009/0274387 A1   Nov. 5, 2009

(51) Int. Cl.
G06K 9/40      (2006.01)
G06K 9/36      (2006.01)
G03B 7/00      (2006.01)
H04N 5/235     (2006.01)

(52) U.S. Cl.
USPC ............ 382/274; 382/254; 382/284; 348/362

(58) Field of Classification Search
USPC ............................ 382/254, 274, 284; 348/362
See application file for complete search history.

(56) References Cited

U.S. PATENT DOCUMENTS

| 5,144,442 | A | | 9/1992 | Ginosar et al. |
| 5,309,243 | A | | 5/1994 | Tsai |
| 5,828,793 | A | * | 10/1998 | Mann ............................. 382/284 |
| 5,914,748 | A | * | 6/1999 | Parulski et al. ................ 348/239 |
| 7,057,650 | B1 | * | 6/2006 | Sakamoto ...................... 348/239 |
| 7,061,524 | B2 | | 6/2006 | Liu et al. |
| 7,127,084 | B1 | * | 10/2006 | Mauk ............................. 382/112 |
| 7,142,723 | B2 | | 11/2006 | Kang et al. |
| 7,239,805 | B2 | | 7/2007 | Uyttendaele et al. |
| 7,301,563 | B1 | | 11/2007 | Kakinuma et al. |
| 7,349,119 | B2 | * | 3/2008 | Tsukioka ....................... 358/1.18 |
| 7,443,533 | B2 | * | 10/2008 | Lin ................................. 358/1.6 |
| 7,495,699 | B2 | * | 2/2009 | Nayar et al. ................... 348/239 |
| 7,519,907 | B2 | * | 4/2009 | Cohen et al. ................... 715/723 |
| 7,612,804 | B1 | * | 11/2009 | Marcu et al. ................... 348/222.1 |
| 2002/0154829 | A1 | * | 10/2002 | Tsukioka ........................ 382/254 |
| 2003/0095192 | A1 | * | 5/2003 | Horiuchi ....................... 348/222.1 |
| 2003/0151689 | A1 | | 8/2003 | Murphy |
| 2004/0100565 | A1 | | 5/2004 | Chen et al. |

(Continued)

FOREIGN PATENT DOCUMENTS

| JP | 2005-175870 | 6/2005 |
| JP | 2007-221423 | 8/2007 |
| KR | 2001-0036040 | 5/2001 |
| WO | WO 2006/073875 A2 | 7/2006 |

OTHER PUBLICATIONS

Debevec et al., "Recovering High Dynamic Range Radiance Maps from Photographs", Proceedings of SIGGRAPH 1997, Computer Graphics Proceedings, Annual Conference Series, pp. 369-378.*

(Continued)

Primary Examiner — Matthew Bella
Assistant Examiner — Jose M Torres
(74) Attorney, Agent, or Firm — David C. Kellogg

(57) ABSTRACT

Methods, image processors and imaging devices for capturing a high dynamic range (HDR) image. Multiple images of a scene are captured at respectively different exposure settings. A further image of an object placed in the scene is captured at one exposure setting. A first radiance image is formed from the multiple images. A second radiance image is formed from the further image. The first radiance image and the second radiance image are merged to form the HDR image.

40 Claims, 8 Drawing Sheets

(56) References Cited

U.S. PATENT DOCUMENTS

| | | |
|---|---|---|
| 2005/0275747 A1 | 12/2005 | Nayar et al. |
| 2006/0002611 A1 | 1/2006 | Mantiuk et al. |
| 2006/0017837 A1 | 1/2006 | Sorek et al. |
| 2006/0083440 A1 | 4/2006 | Chen |
| 2006/0114333 A1 | 6/2006 | Gokturk et al. |
| 2006/0192867 A1 | 8/2006 | Yosefin |
| 2006/0192873 A1 | 8/2006 | Yaffe |
| 2006/0209204 A1 | 9/2006 | Ward |
| 2006/0251216 A1 | 11/2006 | Allred et al. |
| 2007/0002164 A1 | 1/2007 | Ward et al. |
| 2007/0242900 A1 | 10/2007 | Chen et al. |
| 2007/0257184 A1 | 11/2007 | Olsen et al. |
| 2008/0023623 A1 | 1/2008 | Davidovici |

OTHER PUBLICATIONS

Mann et al., "On Being 'Undigital' with Digital Cameras: Extending Dynamic Range by Combining Differently Exposed Pictures", In Proc. IS&T's 48th annual conference, pp. 422-428, Washington, D.C., May 7-11, 1995.*

Eden et al., "Seamless Image Stitching of Scenes with Large Motions and Exposure Differences", IEEE Computer Society Conference on Computer Vision and Pattern Recognition, vol. 2, 2006.

Xiao et al., "High Dynamic Range Imaging of Natural Scenes", Tenth Color Imaging Conference: Color Science.

Capra et al., "Adaptive Image Data Fusion for Consumer Devices Application", IEEE $6^{th}$ Workshop on Multimedia Signal Processing, 2004, pp. 243-246.

Khan et al., "Ghost Removal in High Dynamic Range Images", IEEE International Conference, 2006.

Cho et al., "Extending Dynamic Range of Two Color Images under Different Exposures", IEEE Proceeding of the $17^{th}$ International Conference on Pattern Recognition, 2004.

Razlighi et al., "Correction of Over-Exposed Images Captured by Cell-Phone Cameras", IEEE International Symposium on Publication, 2007.

* cited by examiner

METHOD OF CAPTURING HIGH DYNAMIC RANGE IMAGES WITH OBJECTS IN THE SCENE

FIELD OF THE INVENTION

The present invention relates to CMOS imagers and, more particularly, to methods and systems for forming high dynamic range (HDR) images.

BACKGROUND OF THE INVENTION

Color digital imaging systems, such as digital cameras, typically employ a single image sensor, such as a charged coupled device (CCD) or a complementary metal oxide semiconductor (CMOS) device, to digitally capture a scene of interest. Image sensors typically include an array of optical detectors, such as photodiodes, that generate an electrical response in proportion to the intensity of incident light. The dynamic range of individual optical detectors is defined by the minimum amount of light that is required to generate an electrical response at the low end and the maximum amount of light beyond which the electrical response of the optical detector does not change (i.e. a saturation point) at the high end.

The dynamic range of an image sensor is an important characteristic when capturing high contrast images. When bright and/or dark areas of an image exceed the dynamic range of an image sensor, the quality of the captured image may be degraded. If the sensitivity of the image sensor is adjusted, such as by decreasing the exposure time to sufficiently capture the features of the bright areas in an image, then the dark features are not captured sufficiently.

One technique for capturing high contrast images with a digital sensor involves capturing two images of the same scene in rapid succession, with the sensitivity of the image sensor set to capture the bright areas in a first image and the dark areas in a second image. The two images may then be used to create a composite image that includes the features of both the bright and dark areas.

Although the two-image technique may extend the dynamic range of an image sensor, changes in the scene between the time of capturing the first and second images may introduce motion artifacts that degrade the quality of the combined image.

BRIEF DESCRIPTION OF THE DRAWINGS

The invention may be understood from the following detailed description when read in connection with the accompanying drawing. Included in the drawing are the following figures.

DETAILED DESCRIPTION OF THE INVENTION

Aspects of the present invention relate to the capture of high dynamic range (HDR) images with objects, such as people, included in a scene. An HDR image that includes objects is generated by using a low dynamic range exposure of the object in the scene, as well as a high dynamic range exposure of the scene itself (i.e. without the object). Because an image of people generally tends to have a limited dynamic range, a single exposure at a suitable exposure setting may be used to cover the entire dynamic range for the people in the scene.

Figure 1:
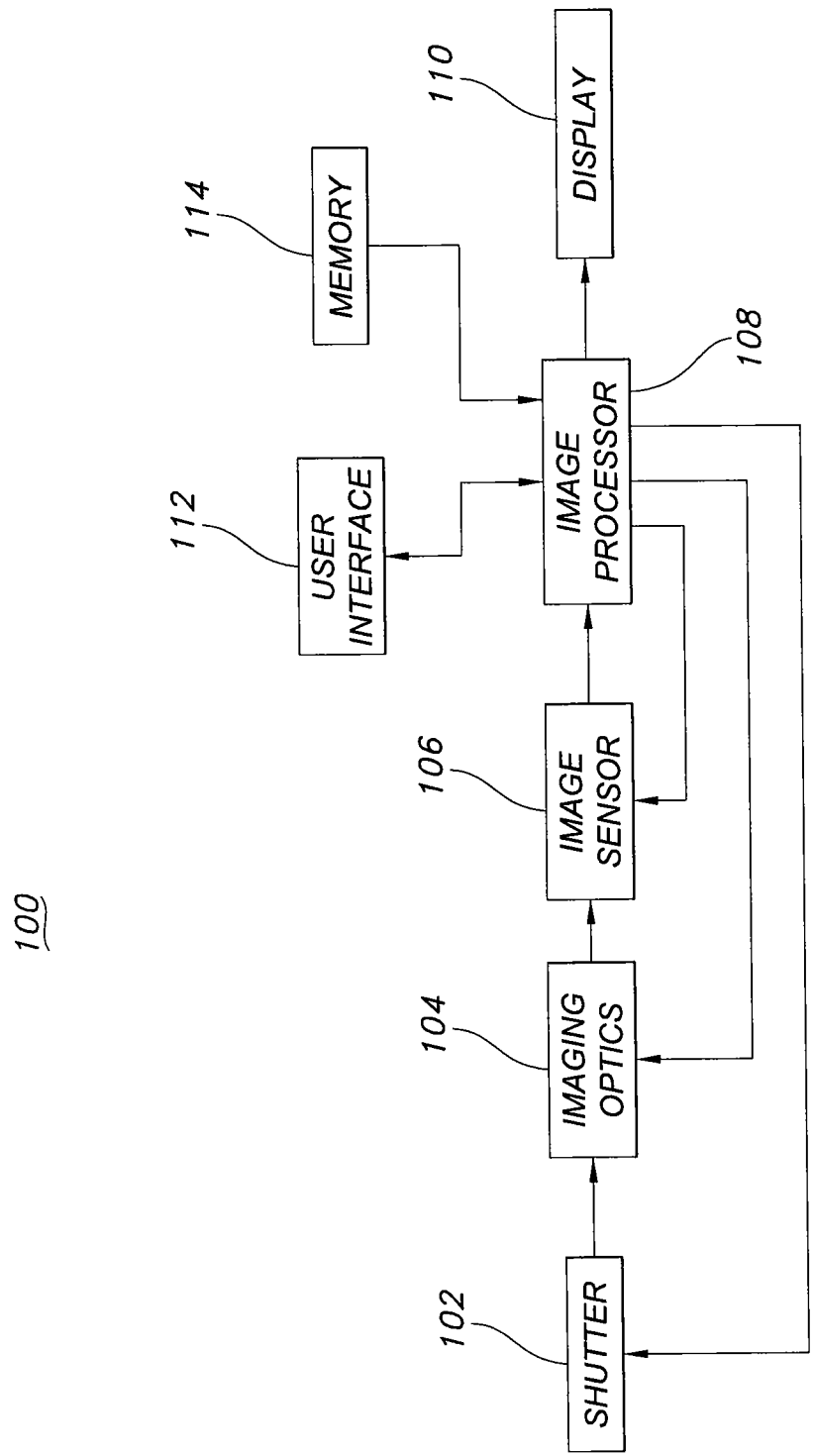
FIG. 1 is a block diagram of an imaging device according to an embodiment of the present invention.

FIG. 1 is a block diagram of an imaging device, designated generally as 100, used to capture digital images and generate HDR images. Imaging device 100 includes shutter 102, imaging optics 104, image sensor 106, image processor 108, display 110, user interface 112 and memory 114. In one embodiment, imaging device 100 is a hand-held digital camera used to capture still digital images. In another embodiment, imaging device 100 is a digital video camera used to capture digital video.

Shutter 102, imaging optics 104 and imager sensor 106 are conventional devices that are well known in digital imaging devices. Display 110 and memory 114 are also well known in digital imaging devices. Image sensor 106 may include CCD and CMOS devices. Image sensor 106 includes an array of optical detectors, referred to as pixels, which individually detect light and generate electrical responses in proportion to received light. In order to capture color images, image sensor 106 also includes color filters, for example, a color filter array (CFA) that separates incident light into different colors, such as red, blue and green and passes the filtered light to the pixels. In an embodiment, shutter 102, imaging optics 104, display 110, user interface 112 and memory 114 are integrated with image sensor 106 and image processing unit 108 into a digital camera.

Image data generated from image sensor 106 is provided to image processor 108 as captured images and stored in memory 114. Image processor 108 uses the captured images to generate an HDR image that may be displayed on display 110 and/or provided to memory 114. In particular, image processor 108 uses the captured images of a scene over a range of exposure settings and another image of an object in the scene to generate the HDR image, described further below with respect to FIG. 2.

An HDR image is typically captured using multiple exposures so that both the low and high scene luminance components may be captured with sufficient accuracy. HDR image construction typically takes longer to process than the time it takes to generate an image from a single exposure. For substantially stationary objects, such as a house, a longer period for capturing multiple images is not a concern. For scenes containing objects such as people and/or animals, however, a long capture period and longer exposure times may create problems with motion artifacts.

Frequently, image registration is used during the merging of multiple images. Image registration refers to a process of providing point by point correspondence among multiple images in a scene. An example of image registration is provided in U.S. Pat. No. 7,142,723 issued to Kang et al. The image registration process, however, may create artifacts (e.g., edge blurs or ghost images) in the resulting HDR image in regions where objects move between various exposures.

In general, imaging device 100 is typically placed on a tripod (not shown), to minimize effects of any motion artifacts during image capture. By providing imaging device 100 on a tripod, the scene may be considered substantially constant over time. It may be appreciated that, if the scene is substantially constant, image processor 108 may generate an HDR image from multiple captured images of a scene over a range of exposure times, without requiring to detect motion, apply motion compensation processing or perform image registration. The exposure for each image may be controlled by varying shutter speed, F-number (i.e. the brightness of the image), or exposure time of image sensor 106.

As described above, high exposure settings tend to represent dark areas more accurately, whereas low exposure settings tend to represent bright areas more accurately. The combination of low to high exposure settings may be combined into a single high dynamic range image. The "dynamic range" of an image, as used herein, refers to the range from the lowest pixel brightness value in the image (corresponding to the lowest detected intensity) to the highest pixel brightness value in the image (corresponding to the highest detected intensity).

If an object, such as a person, however, is included in a scene and the object varies more quickly than the scene or is prone to motion, it may be difficult to capture an HDR image without motion compensating the object. For example, a relatively stationary person may be captured in an image with a short exposure time of about $\frac{1}{30}$ of a second without detecting movement. When the exposure time becomes about 1 second, for example, even though the person is relatively stationary, there may still be movement in the captured image that degrades the HDR image quality.

The entire HDR capture process may take about 1 to 2 minutes, including all the exposures and preparation time. Accordingly, if a person (relatively stationary) is included in a scene (substantially constant) and an HDR image is generated from multiple images over a range of exposure times, the quality of the image may be degraded due to motion artifacts. As a result of such HDR capture process with people in the scene, direct merging of individual images in the HDR sequence may cause edges of the moving elements to blur and degrade the quality of the HDR image.

In order to include objects that may move in a scene, imaging device 100 captures multiple images of the scene (referred to herein as multiple scene images) over a range of exposure times $T_1, T_2, \ldots, T_N$ (i.e., over a high dynamic range). For example, the range of exposure times may include $T_1$ of about $\frac{1}{8000}$ of a second to $T_N$ of about 20 seconds for 14 different exposure times at a fixed aperture value.

In addition, an object may be placed in the scene and then imaging device 100 may capture another image of that object (referred to herein as an object image) at a single low exposure time suitable for capturing the object. The single object image may be captured with a low dynamic range.

Image processor 108 forms an HDR image using the multiple scene images that do not include the object and merges the other image that includes the object. By merging the multiple scene images with the single object image, the process of the invention uses images with substantially no motion. Accordingly, motion artifacts are reduced.

User interface 112 may be used to selectively capture the multiple scene images or the object image. Depending upon the settings selected by user interface 112, image processor 108 may be directed to adjust one or more of the speed of shutter 102, the focus of imaging optics 104, or the exposure time of image sensor 106. Although image processor 108 is illustrated as controlling adjustment of shutter 102, imaging optics 104 and image sensor 106, it will be understood that imaging device 100 may be configured by other means to adjust shutter speed, focus, F-number, exposure time and/or any other parameter in order to capture images with different exposure settings and provide both high and low dynamic range images.

A predetermined range of exposure settings may be used to capture the multiple scene images. For example, the range of exposure settings may be stored in memory 114. To capture another single object image, imaging device 100 may determine a suitable exposure setting or exposure time $T_i$ for the object, depending upon lighting conditions, distance to the object, focusing of the object, etc. For example, imaging device 100 may capture a test image and adjust the exposure settings to optimize capture of the single object image. The exposure settings for the object image may be adjusted, for example, based on a lookup table stored in memory 114. It will be understood that exposure time Ti of the object image may be different from exposure times of the multiple captured scene images. In one embodiment, a range of illumination for the multiple scene images may be greater than 100 dB (decibels) whereas a range of illumination for the single object image may be less than about 30 dB.

Figure 2:
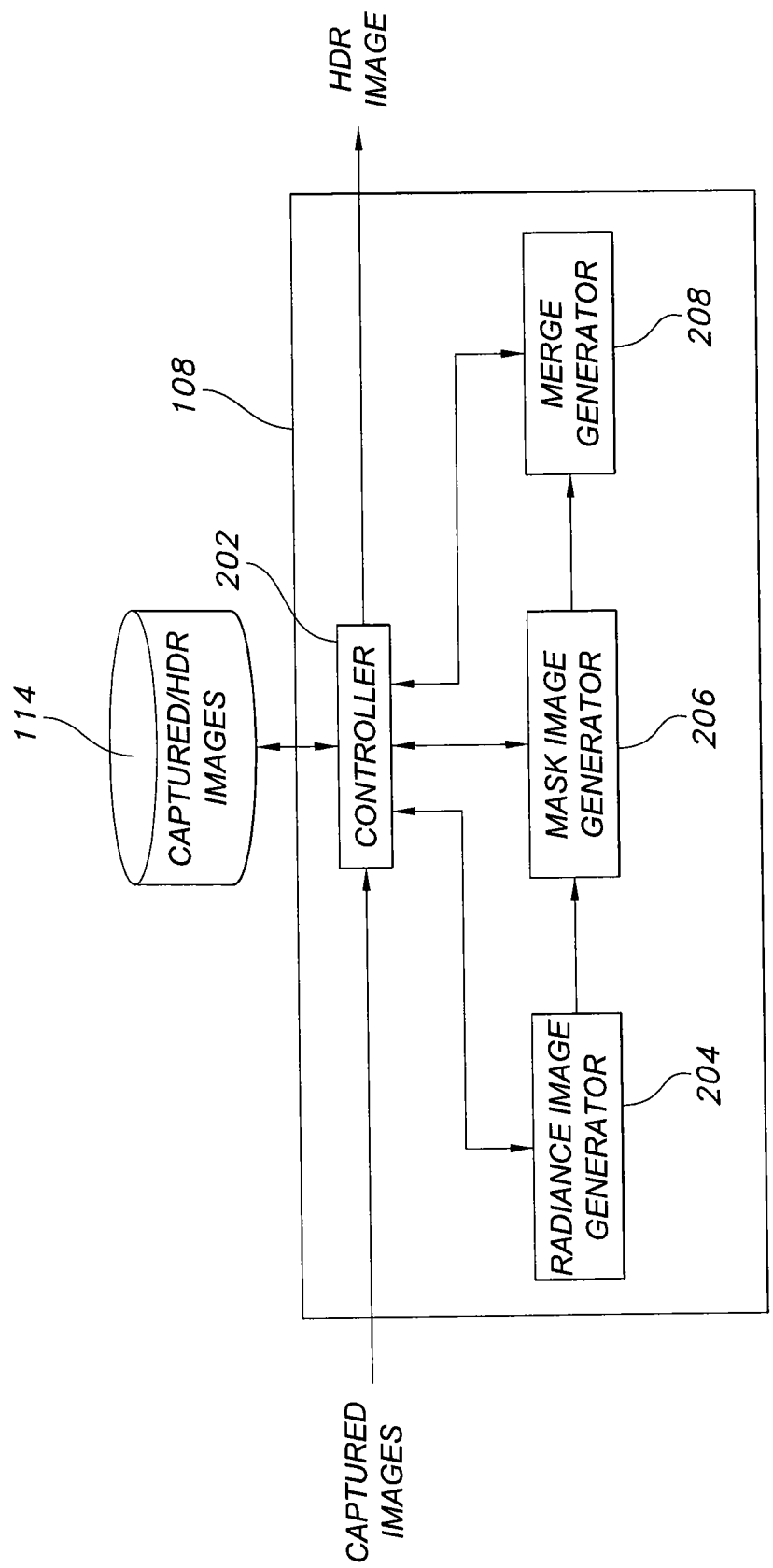
FIG. 2 is a block diagram of an image processor included in the imaging device shown in FIG. 1, according to an embodiment of the present invention.

FIG. 2 is a block diagram of image processor 108. Image processor 108 includes controller 202, radiance image generator 204, mask image generator 206 and merge generator 208. Captured images may be provided to controller 202 and stored in memory 114. An HDR image generated by image processor 108 may be provided from controller 202 to memory 114 and/or display 110 (FIG. 1). Image processor 108 may include any suitable software for generating HDR images.

Controller 202 controls radiance image generator 204, mask image generator 206 and merge generator 208 for generating an HDR image from multiple captured scene images (over a range of exposure settings) and another object image (at a low exposure setting). Controller 202 may also receive selection information from user interface 112 and adjust one or more settings of shutter 102, imaging optics 104 or image sensor 106, according to whether multiple scene images or a single object image is selected.

Figure 8:
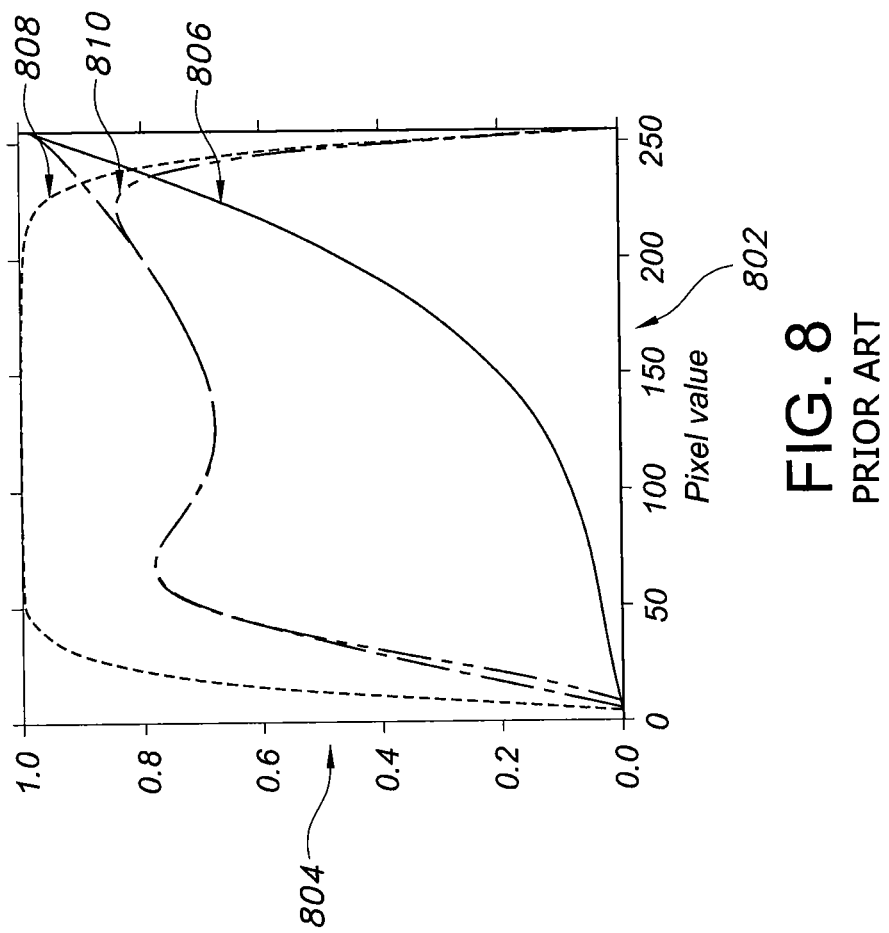
FIG. 8 is a conventional graph of scene exposure as a function of camera sensor pixel value illustrating examples of HDR weighting functions used to form a radiance image from multiple scene images.

Radiance image generator 204 receives multiple images of the scene (having a high dynamic range) and form a first radiance image from the multiple images. Radiance image generator 204 also receives the other image of the object in the scene (having a low dynamic range) and form a second radiance image. An example of radiance image generation is described in U.S. Pat. No. 7,142,723 issued to Kang et al. In general, input images are converted to a radiance image using a known exposure value and a known imaging device response function $F_{response}$. A final radiance value at a pixel is typically computed as a weighted sum of the corresponding pixels in the radiance images. The radiance of an individual pixel is typically provided as:

$$\text{Rad} = \frac{F_{response}^{-1}(p)}{\exp} \quad (1)$$

where Rad is the radiance of a pixel, p is the pixel intensity and exp is an exposure level. The imaging device response function may include known imaging device parameters used to capture the multiple scene images or the object image. For example, the speed of shutter 102 and aperture settings of imaging optics 104. In one embodiment, suitable imaging device parameters are stored, for example, as metadata information associated with each of the images. Referring to FIG. 8, in another embodiment, the camera system response curve is known and is inverted to form inverted camera system response curve 806 (shown in FIG. 8 as a function of scene exposure 804 and camera sensor pixel value 802). The inverted camera response curve 806 is used to revert to a linear relationship between scene radiances and pixel values.

Accordingly, a first radiance image is generated from the multiple scene images, by combining the pixel radiances from the multiple scene images, and a second radiance image is generated from the single object image. With respect to generation of the first radiance image, a weighting function is typically used to average the linear exposures together. Referring to FIG. 8, two examples of weighting functions 808, 810 are shown with respect to scene exposure 804 and camera sensor pixel values 802. Because low-value pixels tend to be prone to noise and high-value pixels tend to be prone to pixel saturation, weighting functions 808, 810 are based on the assumption that mid-range pixels tend to be more reliable for radiance estimation than low- and high-value pixels.

Mask image generator 206 receives at least one of the multiple scene images and the object image and subsequently generates a masked image. In one embodiment, controller 202 selects one of the multiple scene images having similar exposure times as the exposure time of the object image. In another embodiment, mask image generator 206 receives multiple scene images and selects one of the multiple scene images as the exposure time. In one embodiment, the selected scene image and the object image are subtracted from each other to form a differential image. The difference between the selected scene image and the object image emphasizes the object in the scene, because features that are common to both images (i.e. the remainder of the scene) are substantially minimized.

To generate a masked image, a boundary is formed around the object in the differential image. The regions that include the object may be given minimum pixel values (e.g. 0), whereas regions that do not include the object may be given maximum pixels values (e.g. 1). A second (i.e. inverse) masked image is generated from the inverse of the masked image. It may be appreciated that the boundary between the regions excluding/including the object may have a sharp (i.e. binary) transition (e.g. 0 to 1) or a soft transition (e.g. a slope from 0 to 1). For example, a soft transition may result in the merged object in the HDR image appearing more natural to response of the human eye.

In one embodiment, mask image generator 206 receives the first and second radiance images generated by radiance image generator 204 and, using the masked image and inverse masked image, forms respective first and second masked radiance images. In another embodiment, merge generator 208 forms the first and second masked radiance images, using the masked image and inverse masked image generated by mask image generator 206. In a further embodiment, controller 202 may form the first and second masked radiance images, using the masked image and inverse masked image, and subsequently provide the masked first and second radiance images to merge generator 208.

The first masked radiance image is formed by multiplying the inverse masked image and the first radiance image. In this manner, the scene, without the object, is included in the masked first radiance image. The second masked radiance image is formed by multiplying the masked image and the second radiance image. Accordingly, the object, without the scene, is included in the second masked radiance image.

Merge generator 208 receives the first and second radiance images, the masked image and inverse masked image (or the masked first and second radiance images) and generate a merged HDR image. As one example, the masked first and second radiance images may be summed together. In one embodiment, the summation at the borders of the two regions is processed differently from the rest of the image. A gradient weighting function is applied so that a smooth transition is achieved between the two regions. Additional adjustments in white balance, exposure, or tonal mapping may be applied to either or both of the two regions to achieve the most pleasing results of the final HDR image.

Figure 3:
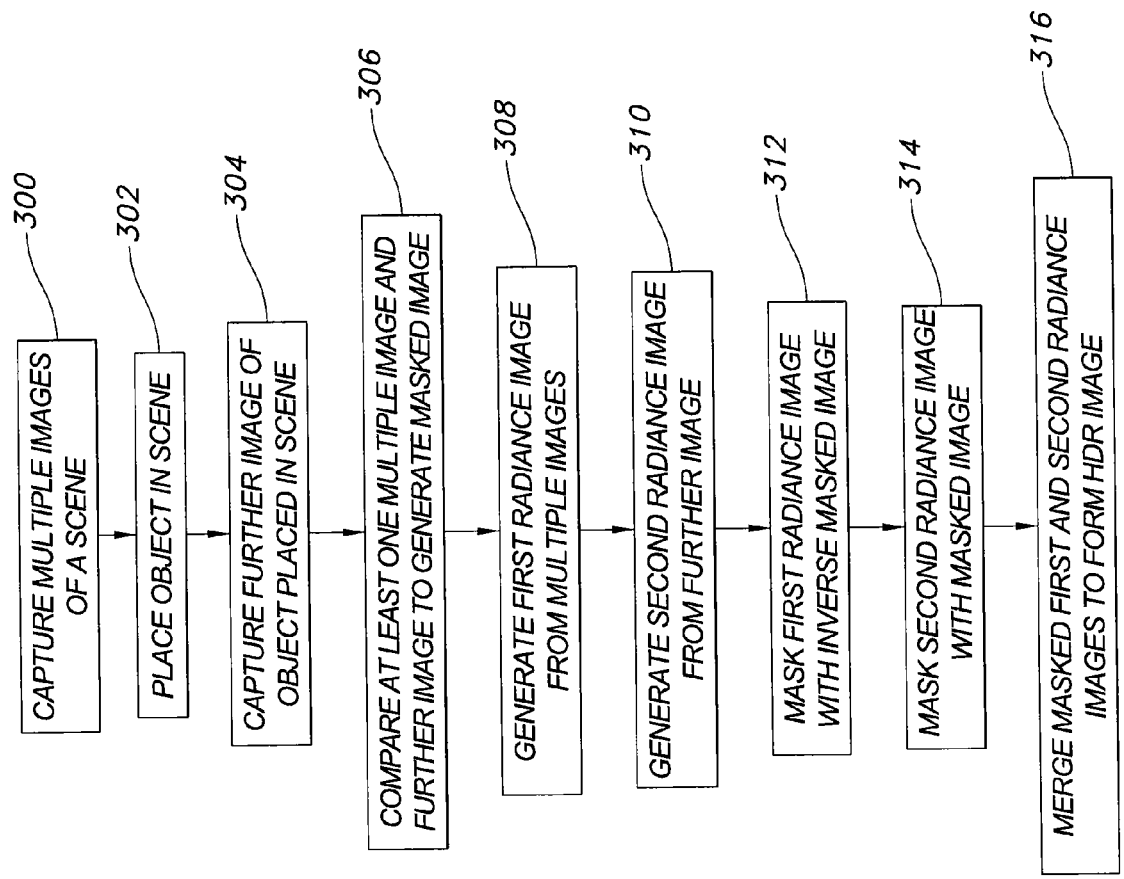
FIG. 3 is a flow chart illustrating a method for constructing an HDR image, according to the present invention.
Figure 4A:
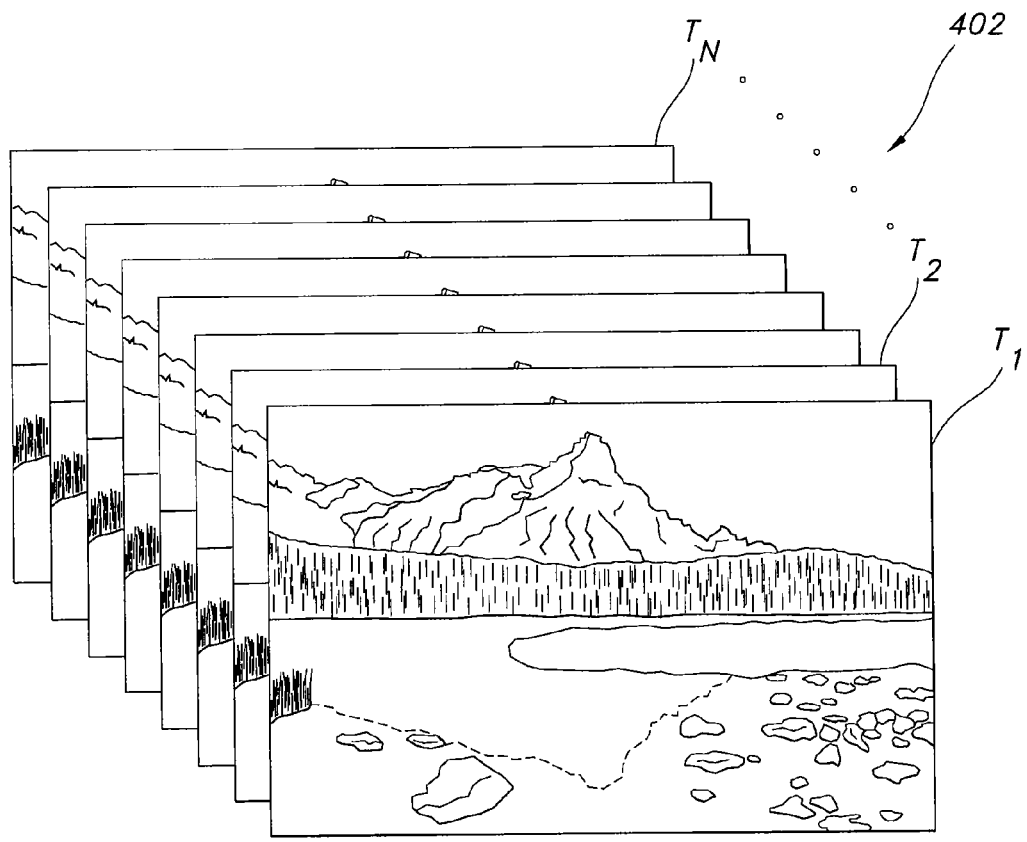
FIG. 4A is an example illustrating capture of multiple images of a scene using a range of exposure times.
Figure 4B:
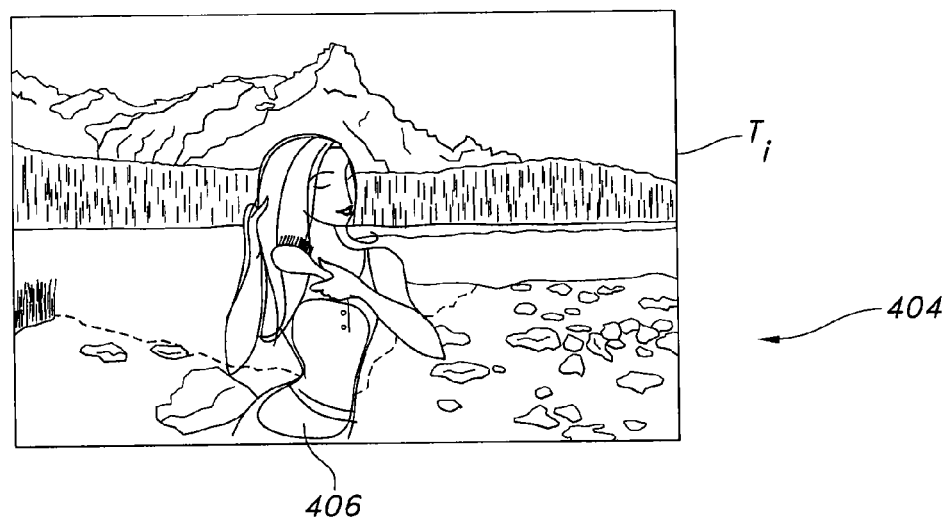
FIG. 4B is an example illustrating capture of a single image of the scene shown in FIG. 4A including an object placed in the scene.
Figure 5:
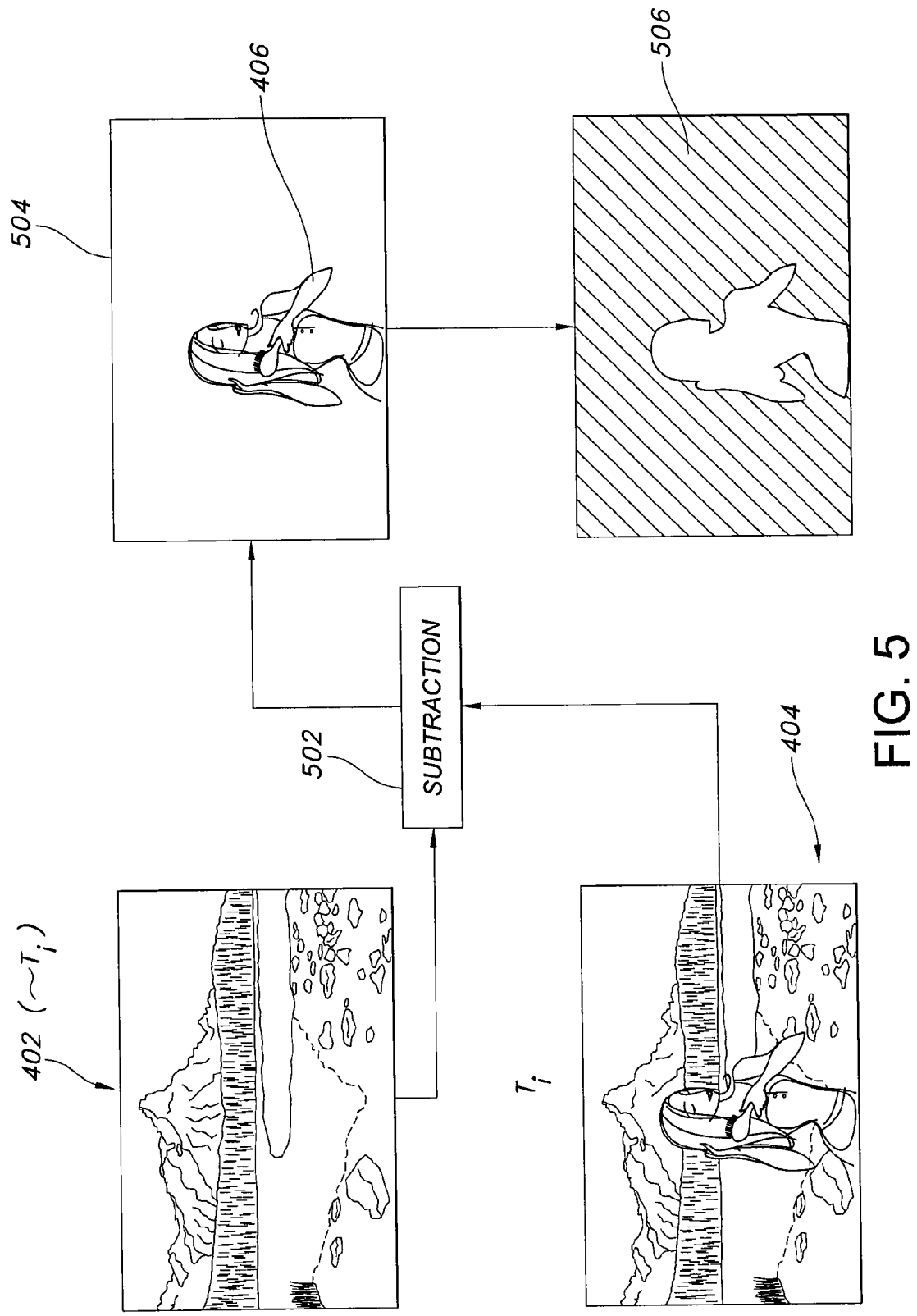
FIG. 5 is an example illustrating generation of a masked image based on the multiple scene images shown in FIG. 4A and the single object image shown in FIG. 4B.
Figure 6:
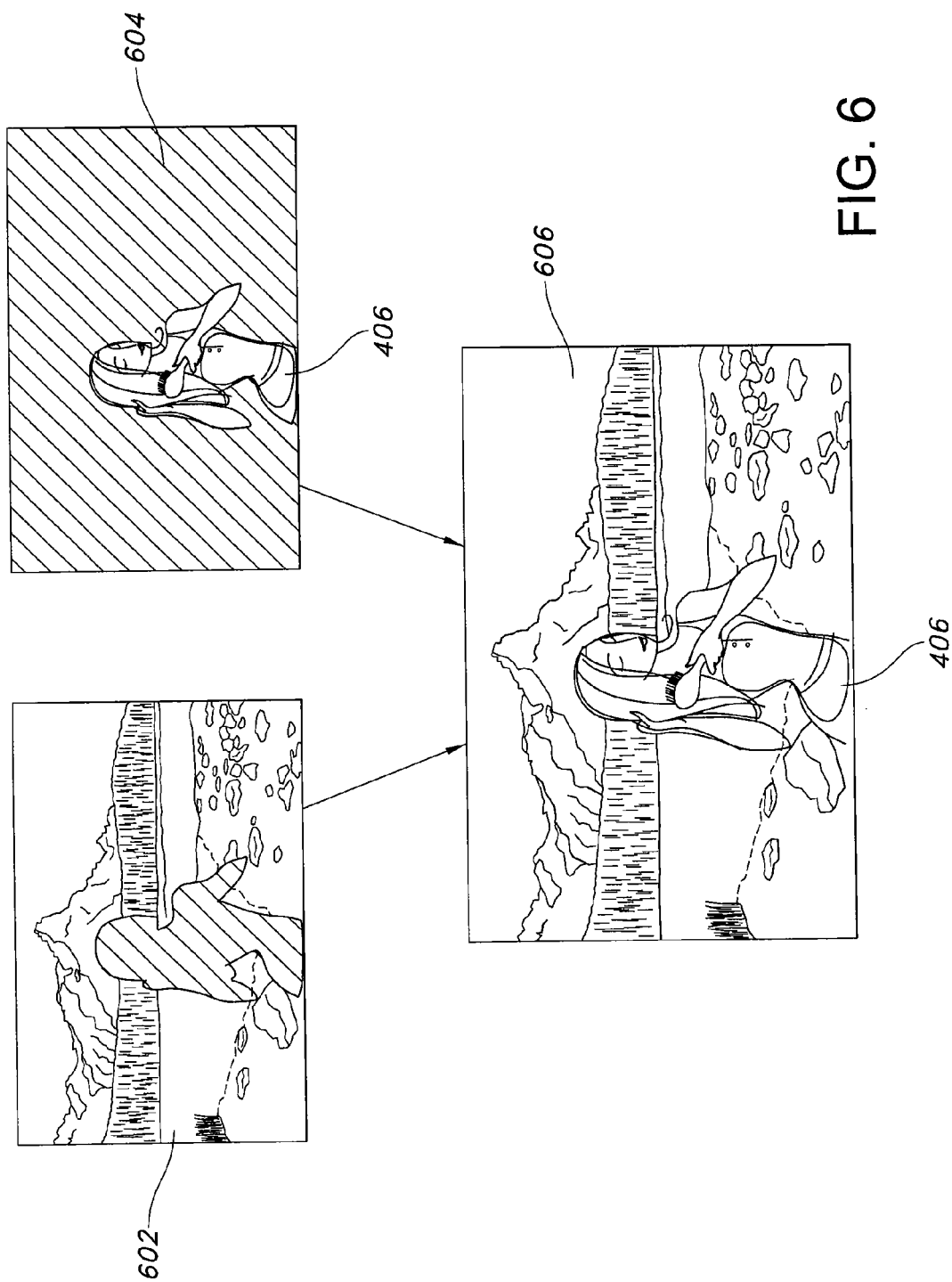
FIG. 6 is an example illustrating formation of an HDR image from the multiple scene images shown in FIG. 4A and the single object image shown in FIG. 4B using the masked image shown in FIG. 5.

Referring now to FIGS. 3-6, methods for constructing an HDR image using image processor 108 (FIG. 2) are described. In particular, FIG. 3 is a flow chart illustrating a method for constructing an HDR image. FIG. 4A is an example illustrating the capture of multiple scene images 402 using a range of exposure times $T_1, \ldots T_N$. FIG. 4B is an example illustrating the capture of object image 404, shown in FIG. 4A, at a low exposure time $T_i$ with object 406 placed in the scene. FIG. 5 is an example illustrating the generation of a masked image 506 based on one of the multiple scene images 402, shown in FIG. 4A, and object image 404 shown in FIG. 4B. FIG. 6 is an example illustrating formation of HDR image 606 from the multiple scene images, shown in FIG. 4A, and the object image, shown in FIG. 4B, using masked image 506, shown in FIG. 5.

The steps illustrated in FIG. 3 represent an embodiment of the present invention. It will be understood that certain steps may be performed in a sequence different from the sequence shown. Some of the steps may be performed simultaneously with other steps.

At step 300, multiple scene images are captured and stored in memory 114 (FIG. 1). For example, referring to FIG. 4A, multiple scene images 402 at exposure times $T_1, \ldots, T_N$ are captured. At step 302, an object (e.g. a person) is placed in the scene. At step 304, this object image is captured in the scene. The object image may also be stored in memory 114 (FIG. 1). For example, referring to FIG. 4B, object 406 is placed in the scene and object image 404 is captured with exposure time $T_i$.

Referring back to FIG. 3, at step 306, at least one multiple scene image is compared to the object image to generate a masked image. For example, one of the multiple scene images may be selected based on similar exposure settings (e.g. $\sim T_i$) to the exposure setting (e.g. $T_i$) of the object image. The selected scene image and the object image may then be subtracted from each other to form a masked image. Referring to FIG. 5, scene image 402 ($T_i$) and object image 404 are subtracted by subtractor 502 to form differential image 504. A masked image 506 is formed based on the border of object 406 in differential image 504. Although not shown, an inverse masked image may be generated, as described above, from masked image 506.

Referring again to FIG. 3, at step 308, a first radiance image is generated from the multiple scene images, for example, by radiance image generator 204 (FIG. 2). At step 310, a second radiance image is generated from the object image, for example, by radiance image generator 204 (FIG. 2).

At step 312, the first radiance image is masked by an inverse masked image, for example, by mask image generator 206 (FIG. 2). Similarly, at step 314, the second radiance image is masked by the masked image. At step 316, the first and second masked radiance images are merged to form the HDR image, for example, by merge generator 208 (FIG. 2). Accordingly, regions of the scene that do not include the object may be represented by the multiple scene images captured over a high dynamic range, whereas region(s) of the scene that includes the object (object image) may be captured with a low dynamic range.

Referring to FIG. 6, a first masked radiance image 602 is formed by masking the first radiance image with an inverse masked image. A second masked radiance image 602 is formed by masking the second radiance image with masked image 506 (FIG. 5). The resulting HDR image 606 is a merging of the first masked radiance image 602 with the second masked radiance image 604. Accordingly, regions of the first radiance image including object 406 are excluded from the first masked radiance image 602 and regions of the second radiance image that do not include object 406 are excluded from the second masked radiance image 604.

Figure 7:
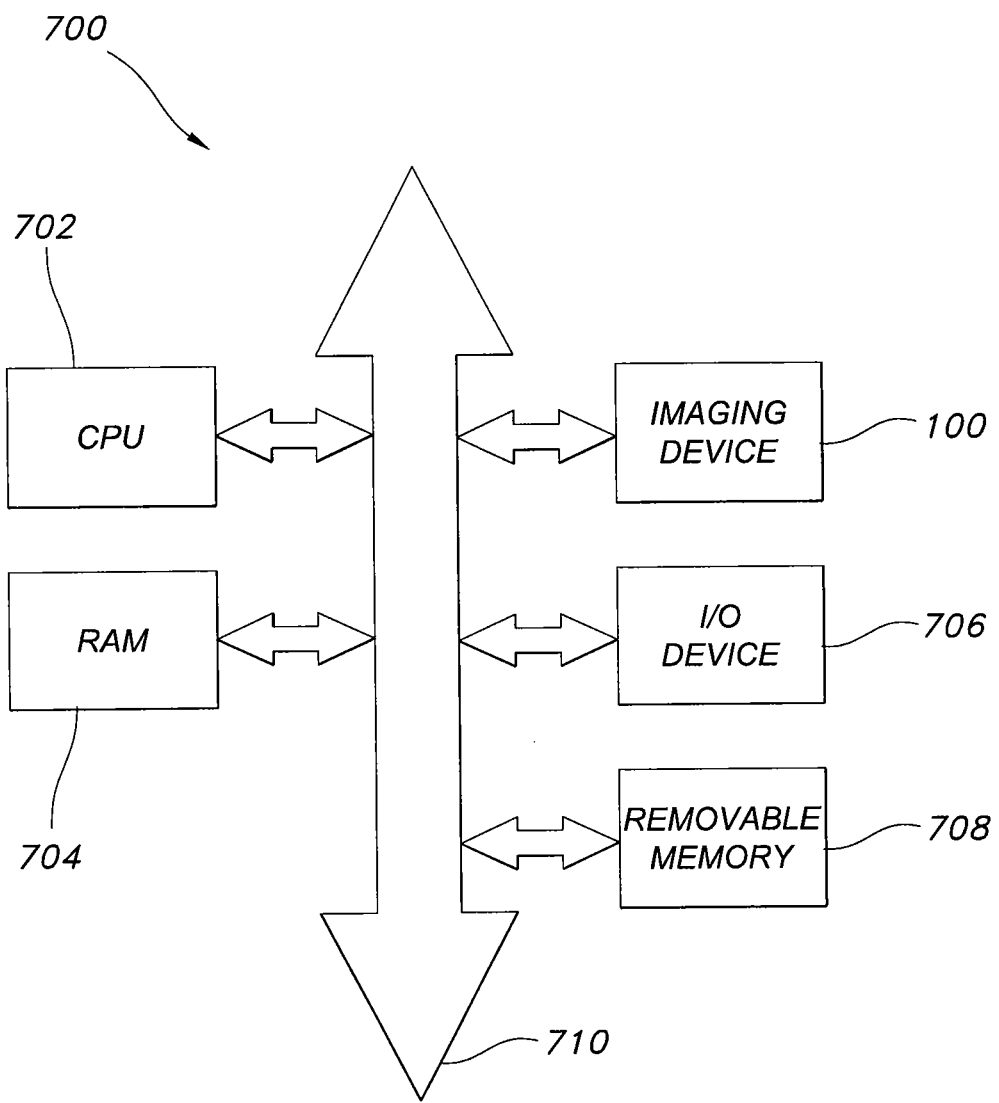
FIG. 7 is a block diagram of a processing system incorporating an image processor according to an embodiment of the present invention.

FIG. 7 shows a typical processor-based system, designated generally as 700, which includes imaging device 100. The processor-based system 700, as shown, includes central processing unit (CPU) 702 which communicates over bus 710 with input/output (I/O) device 706 and imaging device 100. The processor-based system 700 also includes random access memory (RAM) 704, and removable memory 708, such as a flash memory. At least a part of CPU 702, RAM 704, and imaging device 100 may be integrated on the same circuit chip.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of capturing a high dynamic range (HDR) image, comprising:
   capturing multiple images of a scene at respectively different exposure settings;
   capturing a further image of an object placed in the scene at one exposure setting;
   forming a first radiance image from the multiple images;
   forming a second radiance image from the further image; and
   merging the first radiance image and the second radiance image to form the HDR image, wherein the HDR image has a first region that includes the object and is formed from the second radiance image, wherein the HDR image has a second region that excludes the object and is formed from the first radiance image, and wherein the first region of the HDR image has a lower dynamic range than the second region of the HDR image.

2. The method according to claim 1, the step of capturing the multiple images including using a predetermined range of exposure settings.

3. The method according to claim 1, the step of capturing the further image including:
   capturing a test image of the object in the scene; and
   selecting the one exposure setting based on the captured test image.

4. The method according to claim 3, wherein the one exposure setting is selected to capture a predetermined dynamic range for the object.

5. The method according to claim 1, wherein the first radiance image includes a high dynamic range.

6. The method according to claim 5, wherein an illumination range associated with the high dynamic range is greater than about 90 dB.

7. The method according to claim 1, wherein the second radiance image includes a low dynamic range.

8. The method according to claim 7, wherein an illumination range associated with the low dynamic range is less than about 50 dB.

9. The method according to claim 1, the step of forming the first radiance image including:
   generating a respective plurality of radiance images for each of the multiple images based on the corresponding exposure setting; and
   combining the plurality of radiance images to form the first radiance image.

10. The method according to claim 1, wherein the scene is slowly varying with time and the object varies faster than the scene.

11. The method according to claim 1, wherein the multiple exposure times are adjusted based on one or more of an exposure time, an F-number or a shutter speed.

12. The method according to claim 1, the step of merging the first and second radiance images comprising:
   forming a masked image by subtracting one of the multiple images from the further image;
   forming an inverse masked image from an inverse of the masked image;
   applying the inverse masked image to the first radiance image;
   applying the masked image to the second radiance image; and
   merging the masked first and second radiance images to form the HDR image.

13. The method according to claim 12, the step of forming the masked image including selecting one of multiple images having a similar exposure setting as the one exposure setting of the further image.

14. The method according to claim 12, wherein the masked image includes a boundary between the region including the object and the region excluding the object.

15. The method according to claim 14, wherein a transition of the boundary includes a binary transition or a sloping transition.

16. The method according to claim 14, wherein the step of merging the first and second radiance images includes applying a gradient weighting function to each of the masked first and second radiance images at the boundary.

17. The method according to claim 1, wherein the HDR image is formed without image registration.

18. The method according to claim 1, wherein the HDR image is formed without motion compensation.

19. An image processor for reconstructing a high dynamic range (HDR) image, comprising:
   a controller that receives:
      a) a first radiance image formed from multiple images of a scene captured over a range of different exposure settings and
      b) a second radiance image formed from a further image including the scene and an object placed in the scene, the further image captured at one exposure setting;

a mask generator that generates a masked image of the object by comparing at least one of the multiple images to the further image; and a merge generator that merges the first radiance image and the second radiance image using the masked image to reconstruct the HDR image, wherein the HDR image has a first region that includes the object and is formed from the second radiance image, wherein the HDR image has a second region that excludes the object and is formed from the first radiance image, and wherein the first region of the HDR image has a lower dynamic range than the second region of the HDR image.

20. The image processor according to claim 19, further comprising a radiance image generator that generates a) the first radiance image from the multiple images and b) the second radiance image from the further image based on a pixel intensity and the exposure settings in the respective multiple images and the further image.

21. The image processor according to claim 19, wherein the mask generator:
subtracts one of the multiple images from the further image to form the masked image, and forms an inverse masked image from an inverse of the masked image.

22. The image processor according to claim 21, wherein the mask generator applies the inverse masked image to the first radiance image and applies the masked image to the second radiance image, and the merge generator merges the masked first radiance image and the masked second radiance image received from the mask generator.

23. The image processor according to claim 21, wherein the controller applies the inverse masked image to the first radiance image and applies the masked image to the second radiance image, and the merge generator merges the masked first radiance image and the masked second radiance image received from the controller.

24. The image processor according to claim 21, wherein the merge generator applies the inverse masked image to the first radiance image and applies the masked image to the second radiance image, and merges the masked first radiance image and the masked second radiance image.

25. The image processor according to claim 21, wherein the masked image includes a boundary between the region including the object and the region excluding the object and the mask generator selects a sharp transition or a soft transition for the boundary.

26. The image processor according to claim 19, wherein the mask generator selects one of the multiple images having a similar exposure setting as the one exposure setting of the further image.

27. The image processor according to claim 19, wherein the scene is slowly varying with time and the range of different exposure settings represents a high dynamic range.

28. The image processor according to claim 27, wherein the object varies faster than the scene and the one exposure setting represents a low dynamic range.

29. The image processor according to claim 19, wherein the image processor reconstructs the HDR image without image registration.

30. The image processor according to claim 19, wherein the image processor reconstructs the HDR image without motion detection.

31. An imaging device for generating a high dynamic range (HDR) image comprising:
an image sensor, including a plurality of pixels, that captures an image; and
an image processor including:

a controller that receives:
a) a first radiance image formed from multiple images of a scene captured by the image sensor over a high dynamic range and
b) a second radiance image formed from a further image including the scene and an object placed in the scene, the further image captured by the image sensor with a low dynamic range, and a merge generator that merges the first radiance image and the second radiance image to generate the HDR image, wherein the merge generator merges portions of the second radiance image including the object with portions of the first radiance image substantially excluding the object, wherein the HDR image has a first region that includes the object and is formed from the second radiance image, wherein the HDR image has a second region that excludes the object and is formed from the first radiance image, and wherein the first region of the HDR image has a lower dynamic range than the second region of the HDR image.

32. The imaging device according to claim 31, further comprising a memory that stores one or more of the first radiance image, the second radiance image, the HDR image, the multiple images and the further image.

33. The imaging device according to claim 31, further comprising a mask generator that generates a masked image of the object by comparing at least one of the multiple images to the further image, wherein the merge generator merges the portions of the second radiance image with the portions of the first radiance image based on the masked image.

34. The imaging device according to claim 31, further comprising a radiance generator that generates the first and second radiance images based on a pixel intensity and the exposure settings of the respective multiple images and the further image.

35. The imaging device according to claim 31, further comprising:
a shutter that selectively passes light associated with the image;
imaging optics that focus the selectively passed light from the shutter to the image sensor; and
a display that displays the HDR image.

36. The imaging device according to claim 35, further comprising a user interface coupled to the image processor and that causes the imaging device to selectively capture the multiple images with the high dynamic range or the further image with the low dynamic range.

37. The imaging device according to claim 36, wherein at least one of the shutter, the imaging optics or the image sensor is adjusted based on the selective capture of the multiple images with the high dynamic range.

38. The imaging device according to claim 36, wherein at least one of the shutter, the imaging optics or the image sensor is adjusted based on selective capture of the further image with the low dynamic range.

39. The imaging device according to claim 31, wherein the high dynamic range is based on a corresponding range of exposure times for the multiple images.

40. The imaging device according to claim 31, wherein the low dynamic range is based on a predetermined exposure time to capture the object in the further image.

* * * * *